Oct. 25, 1932.     F. F. METZGER     1,884,073
EXTENSOMETER
Filed March 7, 1930     2 Sheets-Sheet 1
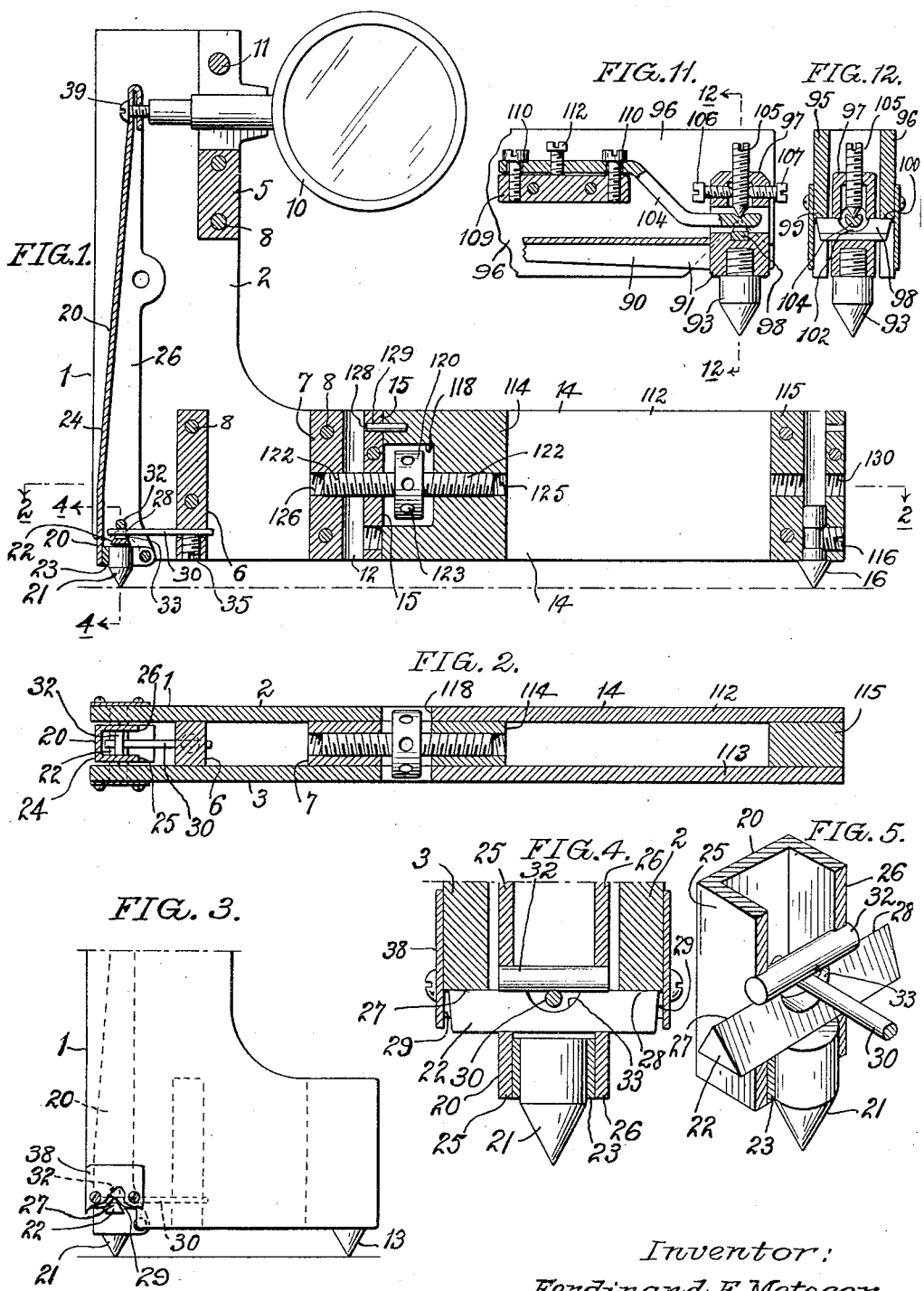
Inventor:
Ferdinand F. Metzger
By F. DeWitt Goodwin
Attorney

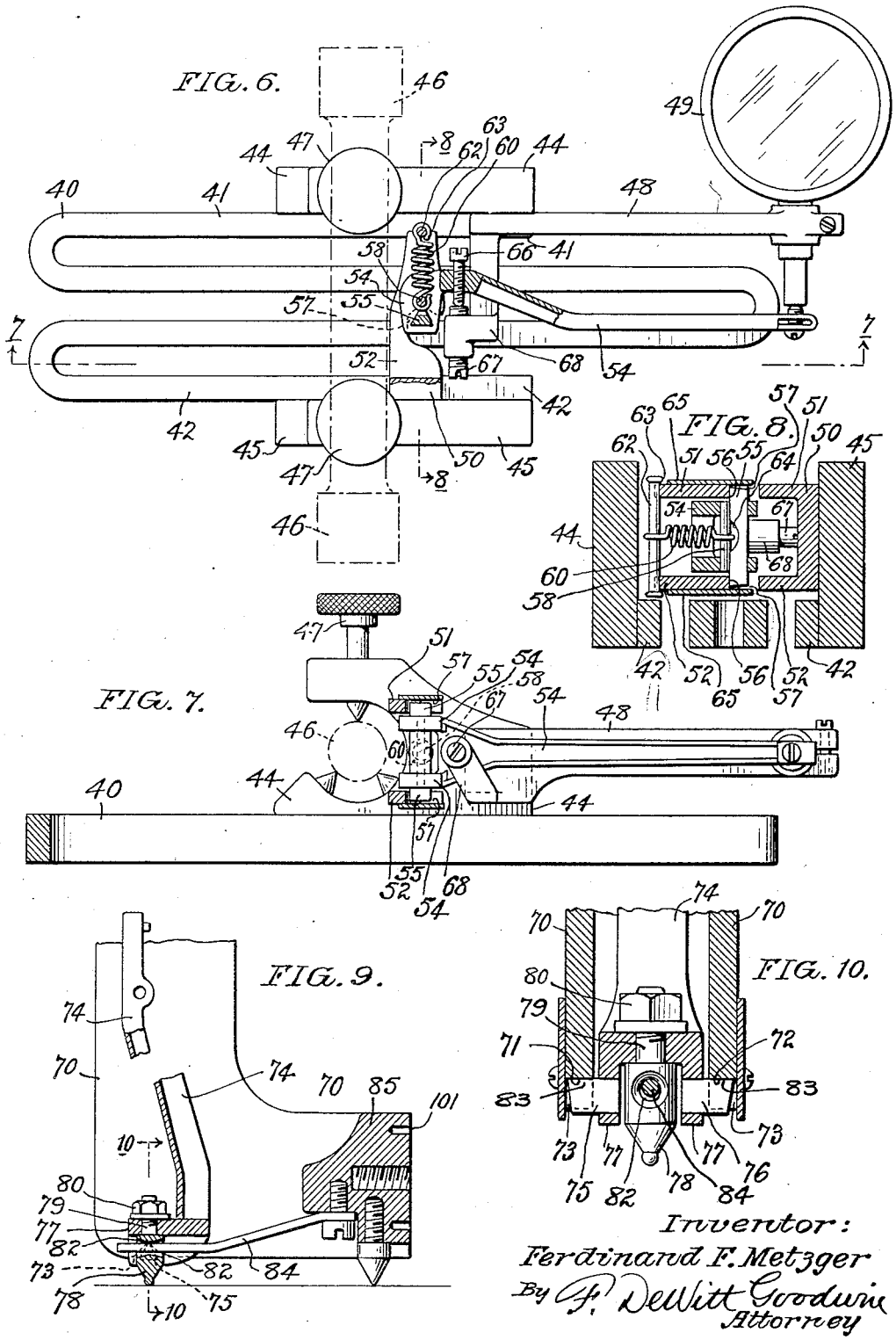

Patented Oct. 25, 1932

1,884,073

UNITED STATES PATENT OFFICE

FERDINAND F. METZGER, OF PHILADELPHIA, PENNSYLVANIA; ALBERT F. METZGER, ADMINISTRATOR OF SAID FERDINAND F. METZGER, DECEASED, ASSIGNOR TO FERDINAND F. METZGER AND SON, OF PHILADELPHIA, PENNSYLVANIA, A FIRM

EXTENSOMETER

Application filed March 7, 1930. Serial No. 433,913.

My invention relates to improvements in extensometers adapted for measuring variations in material which may be in the form of specimens on which strains are applied by a testing machine or in actual field work for measuring the strain on building constructions. Instruments of this character are also known as strain gages. My invention may also be applied to various forms of recording instruments and weighing scales.

The object of my invention is to provide an instrument having a movable lever and a frame, or bearing, with means for mounting the lever in the bearing, or frame, in such a manner that said means will not exert any force upon the lever which would tend to impart a pivotal movement to the lever, or retard the pivotal movement of the lever when acted upon by another force; a further object of my invention is to hold the lever in the bearing by means of a spring which is connected, or applied, to the lever at the pivotal axis of the lever, whereby the action of the spring will not tend to move the lever about its axis, nor retard the free return movement of the lever to its normal position, after force has been applied to the lever for moving it from its normal position, thus providing an instrument which is highly sensitive in operation, and which will return exactly to the zero point during successive tests or operations; a further object is to construct a lever having the longer arm thereof constructed of channel formation whereby the weight of the lever arm may be reduced without reducing the rigidity of the frame, thus providing a lever arm which is very light in weight and having a very slight inertia, which is to be overcome by the force applied to the shorter arm of the lever, and the arm will have sufficient rigidity to move the gage, dial, or recording instrument; a further object of my invention is to provide a novel means for attaching an extension bar to the frame or bearing of a strain gage or extensometer, whereby the parts will be rigidly joined together in such a manner that flexibility between the parts is eliminated. These together with various other novel features of construction and arrangements of the parts, which will be more fully hereinafter described and claimed, constitute my invention.

Referring to the accompanying drawings Fig. 1 is a central vertical sectional view of my improved extensometer; Fig. 2 is a horizontal sectional view on line 2—2, Fig. 1; Fig. 3 is a partial side elevation of the strain gage shown in Fig. 1, with the extension bar removed; Fig. 4 is transverse vertical section on line 4—4, Fig. 1, drawn on a larger scale; Fig. 5 is a perspective view of the lever shown in Fig. 4 with the bearing or frame removed; Fig. 6 is a plan view partially in section of a different form of extensometer, showing a modified form of my novel means for mounting the lever in the bearing or frame; Fig. 7 is a vertical sectional view on line 7—7, Fig. 6; Fig. 8 is a transverse vertical section on line 8—8, Fig. 6; Fig. 9 is a partial vertical central sectional view of an extensometer showing a still different means for retaining the lever in the bearing or frame; Fig. 10 is a transverse vertical sectional view on line 10—10, Fig. 9, drawn on a larger scale; Fig. 11 is a central vertical longitudinal sectional view of a lever and bearing showing a different arrangement of the part upon the lever engaged by the retaining spring; and Fig. 12 is a transverse section on line 12—12, Fig. 11.

Referring to the accompanying drawings in which like reference characters refer to like parts, 1 represents a strain gage or extensometer comprising a frame or bearing consisting of cheek pieces 2 and 3, rigidly secured together by spacing blocks 5, 6, and 7, and fastening devices 8. The block 5 is provided with a clamp screw 11, adapted for detachably retaining the dial micrometer 10, which may be of any well known type. The block 7 is provided with an aperture 12 in which may be secured a conical pin 13, as shown in Fig. 3.

The extension bar 14 is secured to the end facing surface 15 of the spacing block 7 and is adapted for carrying a pin 16 at the outer end of the bar 14, as shown in Fig. 1. A pin 13 may be secured in short instruments for use in connection with short test pieces, as shown in Fig. 3, or a pin 16 may be used as shown in Fig. 1, as the fixed pin for use on larger specimens where an extension bar 14 is required. The novel means for securing the extension bar 14 to the block 7 will be hereinafter more fully described.

The movable lever 20 is provided with a pin 21, preferably having a conical point which is adapted to engage a punch mark upon a specimen to be measured or tested. A pivot shaft 22 is secured in the lever 20 and its ends are pivotally mounted in the bearing formed by the side plates 2 and 3. The lever 20 consists of a head 23 in which the pin 21 is secured and forms the short arm of the lever, and a longer arm 24 constructed of channel formation.

The shaft 22 is rigidly secured in the side walls of the channel bar forming the longer arm of the lever 20. The opposite ends of the shaft 22 project beyond the side walls 25 and 26 of the lever arm 24 and are mounted in the cheek pieces 2 and 3. The shaft 22 is constructed with a knife edge or edges 27 and 28 which engage the side walls 2 and 3, which latter are provided with notches 29 in which the knife edges 26 and 27 upon the opposite ends of the shaft 22 are pivotally seated. The knife edges are adapted to rock in the notches 29 of the bearing, thus the pivotal axis of the lever is formed in alignment with the knife edges located upon the opposite ends of the shaft 22.

A spring 30 is provided having one end mounted in the block 6 and its other end applied to the lever 20, at a point upon the lever which is located upon the pivotal axis of the lever whereby the spring 30 will hold the knife edges of the pivot shaft 22 in the notches 29, of the bearing frame, thus retaining the lever 20 in the bearing or frame, without applying any force to the lever 20 which would tend to move the latter upon its pivotal axis or retard the free pivotal movement of the lever. A retaining part in the form of a bar 32 is rigidly mounted on the lever 20 and said bar 32 is located with its cylindrical surface immediately upon the knife edge of the shaft 22. The central portion of the shaft 22 is provided with a recess 33 for the free passage of the spring 30, so that the lever may rock without the shaft 22 engaging the spring 30. By mounting the retaining bar 32 upon the knife edge of the shaft 22, the portion of the spring 30 which is in contact with the bar 32 will be located exactly upon the pivotal axis of the lever 20. The shaft 22 and the point of contact with the spring 30 are located upon the same side of the pivotal axis of the lever, and the bearing surfaces at the bottom of the notches 29 are located upon the opposite side of the axis of the lever 20 relatively to the shaft 22, thus the action of the spring 30 will not tend to rock the lever upon its axis, nor will it retard the pivotal movement of the lever when force is applied to the point of the pin 21.

The spring 30, shown in Figs. 1 to 5, is in the form of a bar which is rigidly secured in the block 6 by a set screw 35, for retaining the lever in the bearing or frame. Retaining plates 38 are secured upon the side faces of the cheek plates 2 and 3 for engaging the ends of the shaft 22, thus retaining the lever 20 in the central position between the cheek plates 2 and 3.

The arm 24 of the lever 20 is constructed of thin metal formed in channel or U-shaped cross section, whereby the longer arm 24 of the lever, carrying the contact screw 39, which operates the instrument 10, will be extremely light in weight and thus have a minimum amount of inertia when acted upon by a force applied to the point of the pin 21, which latter represents the short arm of the lever.

The form of my invention shown in Figs. 6, 7 and 8 illustrates a strain gage, or extensometer, consisting of a frame 40 in the form of a fork in which the end bars 41 and 42 are adapted to move in parallel relation to each other. Upon the bars 41 and 42 are secured clamp blocks 44 and 45, in which a specimen 46 is adapted to be secured by clamp screws 47. The specimen 46 is indicated in dot and dash lines in Figs. 6 and 7.

The clamp block 44 is provided with an extension arm 48 upon which is mounted the dial micrometer 49. The clamp block 45 has rigidly secured thereto a bracket 50 having cheek pieces, or bearings 51 and 52, between which a lever 54 is pivotally mounted by means of a pivot shaft 55, having a knife edge 56 formed thereon, as shown in Fig. 8. The ends of the shaft 55 project beyond the side walls of the lever 54 and engage said bearings or cheek pieces 51 and 52, which are provided with notches 57, in which the knife edges on the ends of the shaft 55 are pivotally mounted.

The lever 54 is provided with a retaining bar 58 which is located adjacent to the knife edge of the shaft 55 and is adapted to be embraced by one end of a coiled spring 60, which is provided for holding the shaft 55 of the lever in the bearings or notches 57 formed in the cheek pieces 51 and 52. Said cheek pieces extend beyond the lever 54 a sufficient distance to retain a cross bar 62, which is embraced by the outer end of the spring 60. The outer ends of the bearings or cheek pieces 51 and 52 are provided with notches 63 for retaining the bar 62 upon the cheek pieces. The shaft 55 is provided with a recess 64, through which the end of the spring 60 passes whereby the shaft 55 will not touch the spring 60 when the lever 54 moves upon its pivotal axis.

The retaining plates 65 are secured upon the outer surfaces of the cheek pieces 51 and 52 for retaining the shaft 55 and the lever in a central position relatively to the cheek pieces. By this arrangement the lever 54 will be held in its bearings by the spring 60 in such a manner that the spring will not tend to impart a pivotal movement to the lever nor retard the free movement of the lever due to the spring being attached to the lever at a point exactly upon, or in alignment with, the pivotal axis of the lever. The outer end of the lever 54 is adapted to engage and operate the stem of the micrometer 49 in the usual manner. An adjusting screw 66 is mounted upon the lever 54 and engages a fulcrum, in the form of a screw 67 adjustably mounted upon a bracket 68 and rigidly secured upon the opposite clamp block 44.

Fig. 9 illustrates a still different manner of applying the action of a spring to the lever at the pivotal axis of the latter. In the form shown in Figs. 9 and 10, the frame 70 is substantially the same as that shown in Fig. 1, and said frame 70 is provided with bearing surfaces 71 and 72 formed at the bottom of the notches 73 formed in the side plates of the frame 70. The lever 74 is provided with a pivot shaft formed of two stud shafts 75 and 76 secured in alignment with each other in the cheek plates 77 of the lever 74. The stud shafts 75 and 76 are provided with knife edges 83 which engage the bearing surfaces 71 and 72 and form the pivotal axis of the lever. The lever 74 is provided with a pin 78 having a ball point adapted for engaging a specimen. The pin 78 is rigidly secured, at its upper end, by means of a threaded shank 79 and a nut 80 upon the lever 74. The pin 78 is provided with a recess 82 for the insertion of one end of a spring 84, having its opposite end secured on the block 85 of the frame 70. The recess 82 is preferably formed of two conical holes extending from opposite sides of the pin 78, thus forming a bearing surface for the spring 84, which surface is located exactly in alignment with the knife edges 83 of the stud shaft 75 and 76, whereby the point of contact between the spring and the pin 78 is located upon the pivotal axis of the lever 74 and the action of the spring tends to hold the lever in the bearing or frame 70, and will not impart any rotary or pivotal movement to the lever, nor will it retard the pivotal movement of the lever.

Figs. 11 and 12 represent another form of my improved extensometer in which the long arm 90 of the lever 91 extends at right angles to the longitudinal axis of the pin 93, which is provided for engaging a specimen. Another pin not shown in the drawings is mounted in a fixed position upon the bearing or frame consisting of cheek pieces 95 and 96 between which the lever is movable for operating a dial, or gage 10, as shown in Fig. 1.

The lever 91 is provided with a pivot shaft 98 extending at right angles to the length of the pin 93 and said shaft 98 has knife edges formed at the opposite ends thereof which engage bearing surfaces 99 and 100 formed at the bottom of V-shaped grooves formed upon the cheek pieces 95 and 96 of the bearing. The shaft 98 is provided with a recess 102 for the entrance of a spring 104 which engages the inner end of a screw 105 having threaded engagement with the upper end of the lever 91. The screw 105 is positioned in the central portion of the lever head 97 and one end of said screw is provided with a conical point which is engaged by the spring 104 having a conical recess formed therein occupied by the point of the screw 105. The head 97 of the lever is provided with set screws 106 and 107, which are positioned at right angles to the screw 105, and extend parallel with the length of the arm 90 of the lever 91.

The screw 105 may be adjusted in the head 97 of the lever so that the point of the screw will be located on the same plane as the axis of the lever. The point of the screw 105 may also be adjusted, or sprung, by means of the set screws 106 and 107 so that the point will be in exact vertical alignment with the knife edges of the shaft 98. By this means for adjustment of the inner point of the screw 105, which is engaged by the spring 104, the point of the screw 105 may be located exactly upon the pivotal axis of the lever 91. The spring 104 is adjustably mounted upon a block 109 which is rigidly secured between the cheek pieces 95 and 96 of the frame. The spring 104 is held upon the block 109 by means of two screws 110 which pass through large holes formed in the spring 104, whereby the spring may be adjusted laterally relatively to the longitudinal axis of the arm 90 of the lever whereby the end of the spring 104, which engages the lever, may be adjusted into exact alignment with the point of the screw 105.

An adjusting screw 112 is provided for tilting the spring upon the block 109 whereby a variation in the tension of the spring upon the screw 105 may be obtained. By this arrangement the spring will hold the lever in the groove forming the bearing surfaces 99 and 100 of the frame, and the point of contact of the spring with the lever will be located exactly upon the pivotal axis of the lever with the frame, and the spring may be adjusted laterally for locating the spring in alignment with the longitudinal axis of the screw 105.

The extension bar 14 consists of cheek pieces 112 and 113, which are secured together by spacing blocks 114 and 115. The latter is provided with a set screw 116 adapted for detachably securing the pin 16 in the block 115. The block 114 is provided with a recess 118, which is occupied by the head 120 of a shaft 122, provided at its opposite ends with right hand and left hand screw threads. The head 120 is also provided with means for turning the shaft 122 as in a capstan screw head. The block 114 is provided with a longitudinal aperture 125, which is threaded to receive one end of the shaft 122. The block 7 of the extensometer is also provided with an aperture 126 which is in alignment with the aperture 125 in the block 114. The aperture 126 is threaded to correspond with the threaded portion of the shaft 122. Said block 7 is provided with apertures 128 for receiving dowel, or steady pins 129 secured in the block 114.

The extension bar 14 may be rigidly secured to the facing surface 15 of the block 7, of the extensometer, by simply screwing the shaft 122 into the aperture 126 formed in the block 7, and tightly turning the head 120, until the block 114 is tightly clamped upon the block 7. Heretofore extension bars have been secured upon strain gages, or extensometers, by means of long threaded bolts which extended the entire length of the extension bar, and said bolts, due to their length, would flex sufficiently to make it difficult to rigidly secure the extension bar upon the extensometer. By mounting a short bolt or shaft 122 at one end of the extension bar, the latter may be rigidly secured to the extensometer, so as to eliminate any flexibility between the parts.

The extension bar may be of any length desired, or by providing the end block 115 with a threaded aperture 130 for receiving the threaded shaft 122 of another extension bar, two or more extension bars may be combined to form the desired length of the extensometer.

My novel means for mounting the lever and the retaining spring upon the bearing or frame of the extensometer, allows the instrument to be used as heretofore, and the spring for retaining the lever in the bearings, as shown in the different forms throughout the drawings, will hold the lever in the bearing without causing any friction upon the lever, thus allowing the lever to move freely during testing operations and permitting the lever to return to its normal, or zero position. By this novel means for mounting the lever in the bearing frame, more minute measurement may be indicated, or measured, than has been heretofore possible.

Various changes in the construction and the arrangement of the parts may be made without departing from my invention.

I claim:

1. An extensometer having in combination, a frame, a bearing in said frame, a lever pivotally mounted in said bearing, a part upon said lever having one element of the surface thereof coincident with the pivotal axis of the lever, and a spring acting against said element of the surface of said part and associated with the frame for holding the lever in said bearing.

2. An extensometer comprising, a frame, bearings in said frame, a pin upon said frame for engaging a specimen, a lever, a transverse shaft upon said lever having end portions with knife edges formed thereon in pivotal engagement with said bearings, a pin secured upon said lever for engaging a specimen, a retaining bar mounted in said lever having one element of the surface thereof extending parallel with and in contact with the knife edge formed upon said shaft, said shaft having a recess formed therein and positioned centrally of the length of the shaft and adjacent to the retaining bar, a spring having one end thereof occupying said recess and engaging said retaining bar upon said element of the surface thereof which is in alignment with said knife edge, and means for securing the opposite end of said spring upon the frame whereby the spring will retain the lever in the bearings.

3. An extensometer comprising a frame, a bearing block in said frame, a lever pivotally mounted in said frame, a pin upon said lever for engaging a specimen, said block having means for detachably securing a pin therein, an extension bar having one end thereof provided with a threaded aperture, said block having a threaded aperture formed therein, a shaft having screw threads formed thereon and adapted to occupy said threaded apertures in said block and in the extension bar, and means located upon the central portion of said shaft for rotating the same for clamping the extension bar against said block of the frame.

4. An extensometer comprising, cheek plates located in parallel relation to each other, spacing blocks secured between said cheek plates, one of said blocks having a facing surface formed thereon, an extension bar having a facing surface adapted to be presented against the facing surface of said block, a shaft having one end thereof in threaded engagement with the extension bar, said last mentioned block having a threaded aperture formed therein and extending through the facing surface thereof to receive one end of said shaft, an enlarged head upon the central portion of said shaft adapted for turning the latter for securing the extension bar against the facing surface of said block, said extension bar having a recess formed therein and occupied by said head and making the latter accessible for turning the shaft, a steady pin mounted upon the extension bar, and said last mentioned block having an aperture formed therein to receive the steady pin.

5. An extensometer comprising a frame, bearings in said frame, a pin upon said frame for engaging a specimen, a lever, a transverse shaft upon said lever having end portions in pivotal engagement with said bearings, means operatively associated with the lever for engaging a specimen, a part upon the lever having one element of the surface thereof coincident with the pivotal axis of the shaft relatively to said bearings, said shaft having a recess formed therein and positioned centrally of the length of the shaft, a spring having one end thereof occupying said recess and engaging said element of the surface of the lever, and means for securing the opposite end of the spring upon the frame whereby the spring will retain the lever in said bearings.

6. A device of the character described comprising a frame, a bearing in said frame, a lever pivotally mounted in said bearing, a bar upon said lever extending parallel with the pivotal axis of the lever, said bar having one element of the contact thereof coincident with the pivotal axis of the lever, a spring having a portion in engagement with said contact surface of the bar, and means for securing said spring in the frame.

7. An extensometer comprising, a frame, a bearing in said frame, a pin upon said frame for engaging a specimen, a lever, a pin upon said lever for engaging a specimen, a shaft upon the lever in pivotal engagement with the bearing, a spring having one end secured upon the frame, a part upon the lever having an element of its surface located adjacent to and coincident with the pivotal axis of said shaft and in alignment with the pivotal axis of the shaft with the bearing, said shaft having a recess formed therein occupied by the other end of said spring, and said spring having an element of its surface in engagement with said part located upon the pivotal axis of the lever for holding the shaft in pivotal engagement with the bearing.

In testimony whereof I affix my signature.

FERDINAND F. METZGER.